Patented Nov. 30, 1948

2,455,214

UNITED STATES PATENT OFFICE 2,455,214

METHOD FOR THE PRODUCTION OF SUCH GLUCOSIDES OF POLYOXY COMPOUNDS WITH CYCLOPENTANE - POLYHYDRO-PHENANTHRENE RING SYSTEM AS HAVE AT LEAST ONE FREE OXY GROUP IN THE STERINE SKELETON

Ingolf Bennekou, Frederiksberg, Denmark, assignor to Lovens kemiske Fabrik v/Aug. Kongsted, Copenhagen, Denmark No Drawing. Application May 20, 1946, Serial No. 671,116. In Denmark May 29, 1941

Section 1, Public Law 690, August 8, 1946
Patent expires May 29, 1961

3 Claims. (Cl. 260—210)

It is known to produce such glucosides of polyoxy compounds with cyclopentane-polyhydrophenanthrene ring system as have at least one free oxy group in the sterine skeleton by making a start from the corresponding oxo-oxy compound, e. g. oestrone, and in this first transforming the keto group or the keto groups into oxy groups by reduction or by reaction with aluminum alcoholate. The oxy-oxy compound formed, e. g. oestradiole, is then condensed with polyacyl derivatives of a carbohydrate, after which the acyl groups are finally removed by saponification. By the reaction between carbohydrate compounds and the said oxy-oxy compounds there is, however, a disposition to side reactions which decrease the output and make the purification of the product obtained difficult.

It has now proved that the said glucosidation of oxy-oxy compounds in the production of glucosides having at least one free oxy group in the cyclopentane-polyhydro-phenanthrene ring may be avoided, the start being made from the acyl glucoside of the oxo-oxy compound which may be produced by condensation of the oxo-oxy compound with an acyl derivative of a carbohydrate. This acyl derivative of the oxo-oxy compound is in accordance with the invention reduced under a simultaneous removal of the acyl groups by saponification—by means of alkali metal and alcohol, e. g. n-propyl alcohol or isopropylalcohol and sodium.

In accordance with a method proposed from another part for the production of glucosides of the steroid series, keto-group-containing acyl glucosides of this series are brought to react with alcohols in the presence of metal alcoholates, whereby the acyl groups of the carbohydrate radicals are saponified, while at the same time the keto groups present are reduced. The principle in this treatment, in which it is a presupposition that a suitable alcoholate is used, e. g. aluminum alcoholate, is that the metal alcoholate and the ketone react with each other into an equilibrium, in which both the ketone corresponding to the alcohol and the alcoholate corresponding to the original ketone are present. When the metal alcoholate is chosen so that the ketone formed in the equilibrium is volatile, it is possible by the evaporation of this ketone to cause the reaction to run to its termination through a series of equilibriums, so that at last the ketone will be completely transformed into the alcohol desired.

In contradistinction to this there is in accordance with the present invention not used such a reversible reaction through metal alcoholates under the formation of a volatile ketone, even if during the process a metal alcoholate is formed, but a reduction is used with an alkali metal and alcohol, i. e. with hydrogen in statu nascendi. It has proved that the reduction with this reduction agent will be performed completely smoothly. As was the case when aluminum alcoholate was used, there will, as mentioned before at the same time occur a removal of the acyl groups of the glucoside by saponification.

The present method may be applied in the production of, e. g. oestradiole-monoglucoside as well as other glucosides with at least one free hydroxyl group of oxy compounds with cyclopentane-polyhydro-phenanthrene ring system. Thus it is possible in accordance with the invention to hydrogenize and saponify acyl glucosides of androsterone and of oxy-oxo compounds of pregnane as well as oxy-oxo compounds of their dehydrogenation products such as dehydroandrosterone and those of the pregnene-series.

*Embodiment example*

10 g. of oestrone-tetra-acyl-glucoside are dissolved in 625 ml. of n-propyl alcohol. Under gentle boiling are gradually added 15 g. of metallic sodium. After cooling the solution is poured into 3 volumes of distilled water, after which an extraction with ether is performed. The total quantity of ether is washed with water and dried over waterfree sodium sulphate. After evaporation of the ether the remainder is dissolved by boiling in a sufficient quantity of ethyl alcohol, from which the oestradiole monoglucoside is separated by cooling. Melting point 228–232°. By re-crystallization the melting point is brought up to 236–237.5°.

The reaction is performed in the same way with the starting point in dehydro-androsteron-tetraacetyl-glucoside.

I claim:

1. Method of simultaneously saponifying and reducing an acyl glucoside of an oxy-oxo cyclo pentane poly hydro-phenanthrene compound selected from the group consisting of the oestrane, androstane, pregnane series and their dehydrogenation products, comprising treating said compound with free alkali metal and alcohol.

2. Method as defined in claim 1 wherein the alkali metal is sodium and the alcohol is normal propyl alcohol.

3. Method as defined in claim 1 wherein the alkali metal is sodium and the alcohol is isopropyl alcohol.

INGOLF BENNEKOU.

REFERENCES CITED

The following references are of record in the file of this patent:

FOREIGN PATENTS

| Number | Country | Date |
|--------|---------|------|
| 60,573 | Denmark | Jan. 25, 1943 |
| 487,229 | Great Britain | June 13, 1938 |